United States Patent Office 3,263,386
Patented August 2, 1966

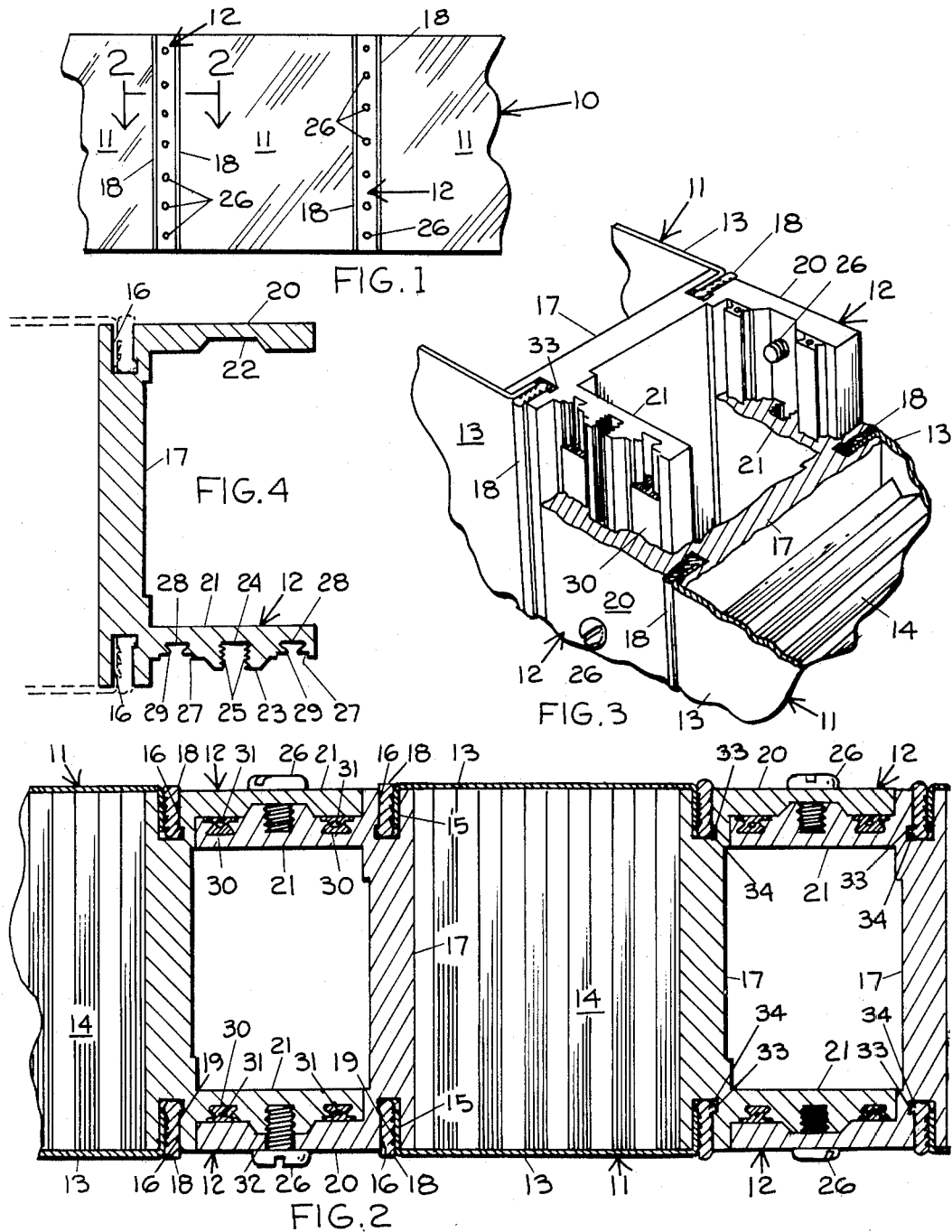

3,263,386
WEATHER TIGHT AND PRESSURE
PROOF PANEL STRUCTURES
Irvine Kimmel, 1231 Stillwater Drive, Miami Beach, Fla.
Filed July 1, 1963, Ser. No. 291,938
5 Claims. (Cl. 52—580)

This invention relates generally to panel structures and is more particularly directed to panels having weather tight and pressure proof joints or connections.

A principal object of the present invention is to provide prefabricated wall structures and the like with a plurality of prefabricated panels joined together with weather tight pressure proof joint members.

Another object of the present invention is to provide a prefabricated panel with an extruded joint member which when connected to a similar but reversed joint member mounted on a second prefabricated panel forms a weather tight and pressure proof wall.

A further object of the present invention is to provide an extruded member for fastening to the edge of prefabricated panels which member is simple in construction, economical in cost and most effective for joining the panels together in a weather tight and pressure proof manner.

A still further object of the present invention is to provide an extruded member for fastening to the edge of prefabricated panels wherein the extruded members coupled together are reversed in position to interengage and form a weather tight and pressure proof connection.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawings:

FIGURE 1 is a fragmentary front elevational view of a wall constructed in accordance with my invention.

FIGURE 2 is a cross sectional view taken along the line 2—2 of FIGURE 1.

FIGURE 3 is a fragmentary perspective view of the panel joint structure.

FIGURE 4 is a cross sectional view of a single joint extrusion with a panel connected thereto shown by dotted lines.

Referring to the drawing wherein like numerals are used to designate similar parts throughout the several views, the numeral 10 refers to a wall constructed in accordance with my invention and consisting of panels 11 joined together by means of extruded joint members 12.

The panel 11 consists of the usual pair of sheet metal facings or walls 13 joined together by insulation material 14, the usual insulation consisting of cardboard honeycomb cemented to the inner surfaces of the sheet metal walls 13 to form a weather proof panel structure 11. The panels 12 are joined along their vertical edge portions to the joint member 12. Inturned edge portions 15 at each end of the panels 11 are received by slots 16 formed in the main body or web portion 17 of the joint member 12. The main body member 17 extends across the full thickness of the panels and are secured thereto by wedge-like splines 18 which are forced into the slots 16 against the inturned edge portions 15 of the metal sheet 13. The splines 18 are provided with a lip portion 34 which engages an undercut portion 33 in the slot 16 and serrations 19 which engage the edge portions 15 to prevent the removal of the splines 18 and the release of the edge portions 15 of the panels 11. All of the joint members 12 mounted on the edges of the panels 11 are identical in construction except that the joint members 12 that are secured together are reversed in position as is explained in detail hereinafter.

Each of the joint members 12 are provided with leg portions 20 and 21 that extend at right angle to the main body or web portion 17. The outer surface of the leg portion 20 is flush with the outer edge of the web portion 17 and on its inner surface there is a longitudinally disposed slot 22 at the mid-portion thereof. The leg portion 21 likewise extends at right angle to the web portion 17, but is set back a distance equal to the thickness of the leg portion 20 so that when the joint members 12 are fastened together the leg portions 20 of the joint members 12 will interengage properly with the leg portions 21 and the outer surfaces 13 of the panels 11 will be flush with each other.

The leg portions 21 are provided with a crown portion 23 which fits into the slot 22 of the leg portion 20 when the joint members 12 are fitted together as best shown by FIGURE 2. At the center of the crown portion 23 is a longitudinally disposed slot 24 whose side walls are serrated as at 25. The serrations 25 form threads for a screw bolt 26 which is used to fasten the joint members 12 together. On each side of the crown portion 23 on the leg portion 21 are shallow slots 27 in the center of which is a somewhat triangularly shaped slot 28 communicating with the shallow slot 27 by means of an opening 29. An extruded pliable liner or weather stripping 30 having a cross section similar to the combined slots 27, 28 and 29. The liner 30 is provided with a medially disposed bore 32 and is slightly larger than the slots 27, 28 and 29 so that when the liners 30 are placed into position in the slots 27, 28, 29, the inner surface of the leg portions 20 will bear against the liners 30 to compress them and seal the junctures of the contacting surfaces of the leg portions 20 and 21 of the joint members 12. The leg portions 20 and 21 are held tightly together by the screw bolts 26 which extend through holes 32 bored at spaced intervals on the leg portions 20. It can be readily noted from the above discussion taken in connection with the accompanying drawing that the joint members 12 constructed in accordance with the instant invention and fastened together as shown and described form a weather and moisture tight and pressure proof connecting member for the panels 11. A room fabricated of such walls will not permit any loss of air pressure past the panels 11 or the interengaged joint members 12. If the upper and lower edges of the panels 11 and joint members 12 are sealed against leakage of air, such a room can be maintained at higher or lower than atmospheric pressure without any air leakages.

In order to fabricate each panel 11 that will interengage with each other without any inconvenience, the joint members 12 on each end of the panel 11 are mounted thereon in reversed position with relation to each other. As best shown by FIGURE 2 the middle panel 2 is provided with the joint member 12 on its left with the leg portion 20 flush with the lower outer surface 13 of the panel 11 while the joint member 12 on the right of the panel 11 has its leg portion 20 flush with the upper surface 13 of the panel 11. The adjoining panels 11 constructed identically to the middle panel 11 will mate the latter without the necessity of having specially and differently fabricated panels 11 to construct the wall 10.

What I claim as new and desire to secure by Letters Patent of the United States is:

1. An elongated joint member for weather tight panel structures comprising an elongated web portion having a slot at each end for fastening a panel thereto, a pair of leg portions extending from said web portion at substantially right angle, one of said leg portions extending substantially flush with an end portion of said web portion, said other of said leg portions being set back from the other end portion of said web portion a distance substantially equal to the thickness of said one of said leg portions, an elongated crown portion mounted on the outer surface of said other of said leg portions, said crown portion having a slot with serrated side walls along its full length, said other of said leg portions having slotted portions on each side of said crown portion, said one of said leg portions having a slotted portion for receiving said crown portion of a second joint member and pliable weather stripping means mounted in said slotted portions of said other of said leg portions, said other of said leg portions having bores for receiving fastening members that extend into said slot and engage said serrated side walls.

2. A weather tight panel structure comprising a pair of spaced apart sheet material, insulation means interposed between said sheet material, to form a weather tight panel, an elongated joint member positioned transversely along each vertical edge portion of said panel, said joint member comprising an elongated web portion in substantial contact relation with said panel and having a slot at each end, end portions of said sheet material being bent at substantially right angle and received by said slots, spline means fitted in each of said slots and frictionally engaged against said end portions of said sheet material, a pair of leg portions extending from said web portion at substantially right angle, one of said leg portions extending substantially flush with an end portion of said web portion, said other of said leg portions being set back from the other end portion of said web portion a distance substantially equal to the thickness of said one of said leg portions, an elongated crown portion mounted on the outer surface of said other said leg portions, said crown portion having a slot with serrated side walls along its full length, said other of said leg portions having slotted portions on each side of said crown portion, said one of said leg portions having a slotted portion for receiving said crown portion of a second joint member and pliable weather stripping means mounted in said slotted portions of said other of said leg portions, said other of said leg portions having bores for receiving fastening members that extend into said slot and engage said serrated side walls.

3. The structure as recited by claim 2 taken in combination with a second panel structure having joint members constructed identically with said first named joint members, said joint member of said first named panel structure in contact relation with said joint member of said second panel structure, bolt means extending through said slots in said crown portions and engaging said serrated side walls for fastening said joint members together with said pliable weather stripping means sealing the juncture of said joint members.

4. An elongated joint member for panel structures comprising a web portion, means for fastening said joint member to a panel, leg portions extending at right angle to said web portion, one of said leg portions being flush with said end of said web portions, said other of said leg portions being off set from the other end of said web portion a distance substantially equal to the thickness of said one of said leg portions, said other of said leg portions having a plurality of slotted portions, one of said slotted portions having serrated side walls for receiving a bolt in fastening a plurality of joint members together, a plurality of pliable weather stripping members received by other of said slotted portions for sealing the juncture of said joint members.

5. A weather tight panel structure comprising a pair of spaced apart sheet material, insulation means interposed between said sheet material to form a weather tight panel, an elongated joint member positioned transversely along each vertical edge portion of said panel, said joint member comprising an elongated web portion in substantial contact relation with said panel, means securing said panel to said joint member, leg portions extending at right angle to said web portion, one of said leg portions being flush with said end of said web portion, said other of said leg portions being off set from the other end of said web portion a distance substantially equal to the thickness of said one of said leg portions, said other of said leg portions having a plurality of slotted portions, one of said slotted portions having serrated side walls for receiving a bolt in fastening a plurality of joint members together, a plurality of pliable weather stripping members received by other of said slotted portions for sealing the juncture of said joint members.

References Cited by the Examiner

UNITED STATES PATENTS

| 1,875,666 | 9/1932 | Schwemlein | 189—36 |
| 3,125,194 | 3/1964 | Kimmel | 52—731 |
| 3,139,960 | 7/1964 | Hammitt et al. | 189—36 X |

FOREIGN PATENTS 217,680 10/1961 Austria.

RICHARD W. COOKE, JR. *Primary Examiner.*